United States Patent [19]
Macheboeuf

[11] 3,764,732
[45] Oct. 9, 1973

[54] METHOD AND APPARATUS FOR REPLACING A PART OF A FIRST TELEVISION IMAGE BY A PART OF A SECOND TELEVISION IMAGE

[75] Inventor: Guy R. Macheboeuf, Vitry-sur-Seine, France

[73] Assignee: Office De Radiodiffusion-Television Francaise, Paris, France

[22] Filed: June 21, 1972

[21] Appl. No.: 264,847

[30] Foreign Application Priority Data

June 25, 1971 France .............................. 7123302

[52] U.S. Cl. .......................... 178/5.4 R, 178/DIG 6
[51] Int. Cl. .............................................. H04n 9/00
[58] Field of Search .................... 178/5.4 R, DIG. 6, 178/DIG. 34

[56] References Cited

UNITED STATES PATENTS

| | | | |
|---|---|---|---|
| 2,244,239 | 6/1941 | Blumlein et al. | 178/DIG. 6 |
| 3,678,182 | 7/1972 | Boxman et al. | 178/DIG. 6 |
| 3,595,987 | 7/1971 | Vlahos | 178/DIG. 6 |
| 3,706,851 | 12/1972 | Froehlich et al. | 178/DIG. 6 |

OTHER PUBLICATIONS

IBM Technical Disclosure Bulletin Vol. 13 No. 3 Aug. '70 pp. 612–613, "Image Contrast Enhancement" VW. T. Townsend

*Primary Examiner*—Robert L. Griffin
*Assistant Examiner*—George G. Stellar
*Attorney*—Abraham A. Saffitz

[57] ABSTRACT

A method for replacing a part of a first television image by a part of a second television image is disclosed in which first or second image signals representing the respective first and second images are selecting according to a binary control signal of which a first level selects signals of the first image and a second level selects signals of the second image. A corresponding apparatus is also disclosed in which circuitry is provided for producing the first level when the amplitude of the second signal lies in a given range and the second level when the amplitude of the second signals lies outside the given range.

Said method and apparatus may be used for replacing a part of a decoration by a person in a color television system.

5 Claims, 5 Drawing Figures

VOLTS V
B_R
V_R2
V_R1
t
n_R
m_R
n̄_R
A
A
B
B
B
m_R.n̄_R

B_R
V_R1
2
m_R
AND GATE
5
m_R.n̄_R
COMPARATOR
AND GATE
6
3
4
9
V_R2
n_R
n̄_R
INVERTER
m_R.n̄_R.m_V.n̄_V.m_B.n̄_B
7
m_V.n̄_V
8
m_B.n̄_B

METHOD AND APPARATUS FOR REPLACING A PART OF A FIRST TELEVISION IMAGE BY A PART OF A SECOND TELEVISION IMAGE

The present invention relates to a method and apparatus for replacing a part of a first television image by a part of a second television image.

A method of composing or synthesizing a television image from elementary images has been proposed in the field of colour television. The image may be standardized to depict the actions of one or more persons within a scene produced by a diapositive of a colour film. In this method, a part of a first image is replaced by a part of a second image which corresponds in position to the part of the first image. In the previously proposed device, video signals of the first and second images are available for each elementary colour. A compositive signal is generated, which comprises either the signal of the first or second image, with the aid of a contactor depending on whether the level of the signal of the first image is higher or lower than a datum level. A device of the nature requires that the second image has very precise colorimetric characteristics since, if this is not the case a part of the first image appears in the second image.

According to a first aspect of the invention, there is provided a method of replacing a part of a first television image by a part of a second television image including selecting first or second image signals representing the respective first and second images according to a binary control signal of which a first level selects signals of the first image and a second level selects signals of the second image and wherein the first level selects signals of the second image and wherein the first level corresponds to the second signals lying in a range of given amplitude corresponding to a background of the second image and the second level corresponds signals the second signal lying outside the range which constitutes said part of the second image which is to replace said part of the first image.

According to a second aspect of the invention there is provided an apparatus for replacing a part of a first television image by a part of a second television image comprising a device for selecting first or second signals corresponding to first and second images according to respective first and second levels of a binary signal, and circuitry for producing the first level when the amplitude of the second signals lies in a given range and the second level when the amplitude of the second signals lies outside the given range.

The invention will now be described in more detail, by way of example only, with reference to the accompanying diagrammatic drawings, in which.

Figure 1:
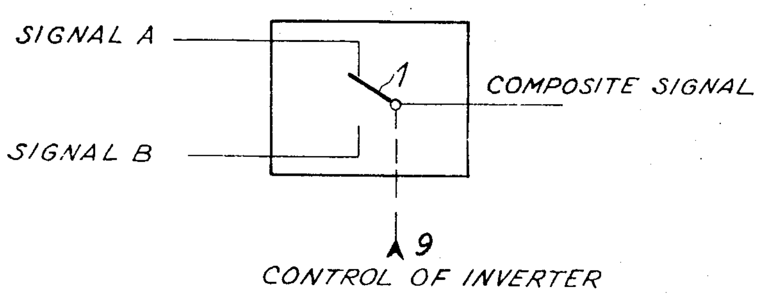
FIG. 1 shows the formation of a composite signal for a black and white television from primary image signals A and B.

In FIG. 1, primary video image signals A which represent for example a set or decoration, and primary video image signals B, which represent for example a person, are transferred to an output line transmitting the required composite signal of the two primary signals A and B. The mixing is performed by a contactor driven by an appropriate control signal whose method of generation will later be described.

Figure 2:
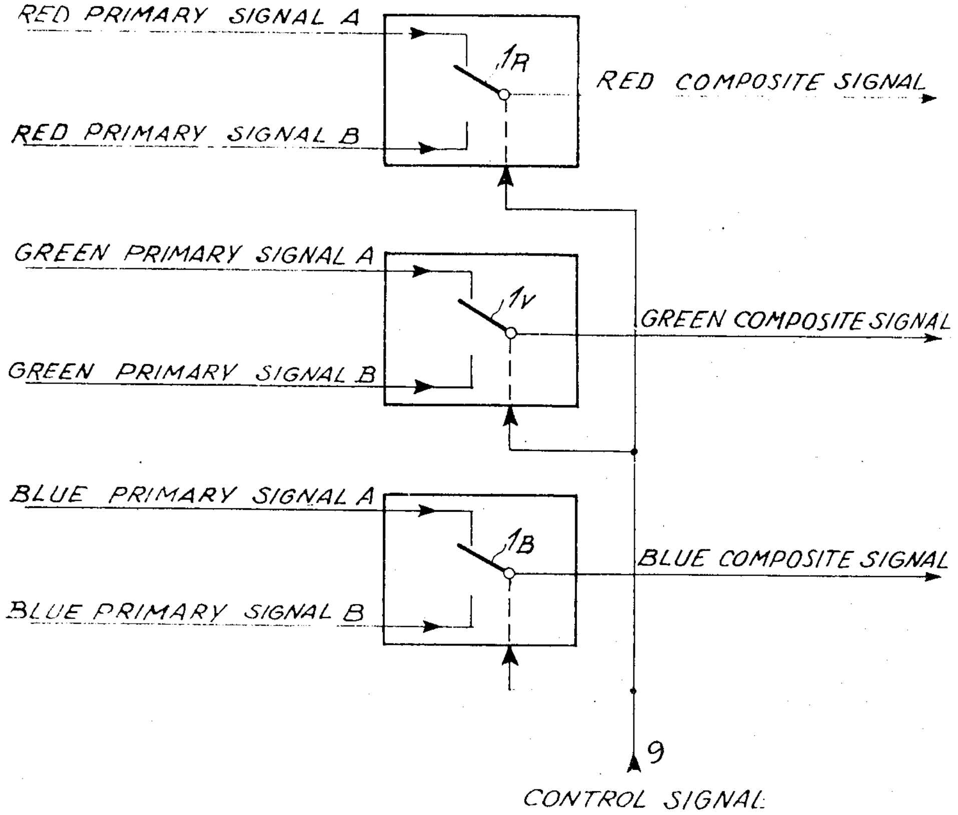
FIG. 2 shows the formation of composite signals for a colour television from primary image signals A and B.

In FIG. 2, the red, green and blue primary video image signals A and B are transferred to output lines transmitting the composite signals of each primary colour. The mixing is performed by respective contactors $1_R$, $1_V$ and $1_B$ controlled by a single control signal transmitted on a line 9.

Figure 3:
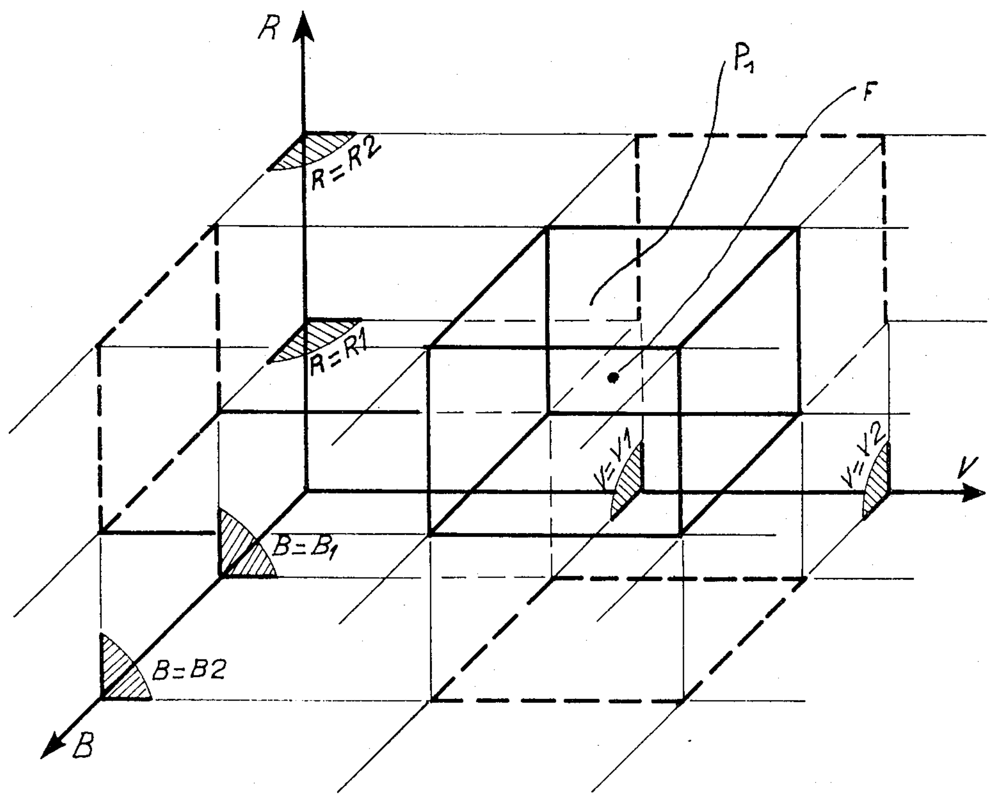
FIG. 3 is a graph of colorimetric ranges of the image signals A and B.

The colorimetric ranges of the image signal B within the conventional co-ordinate system R, V, B (red, green, blue) are shown in the graph of FIG. 3. The background of the image represented by the signal B is centered around a point F having the co-ordinates $R_F$, $V_F$, $B_F$ and remains within a parallelpiped $P_1$ drawn in thick lines. The rest of the image is to be found in the remainder of the trihedron R,V,B, which has a volume $P_2$. For example, the background of the image may be a scene and the remainder of the image may be a person. The control signal for the contactors is at its higher level when the primary image signals B correspond to the background, that is to say to the space $P_1$, and at its lower level when the primary image signals B correspond to the space $P_2$. The final composite image signal comprises the image signals A and that part of the image represented by signals B which represents the person. The signals representing the person replace signals of the image signals A representing that part of the scene in which he is situated. The signal representing the person should not be included in any point of the space $P_1$.

This condition may readily be established, for example, by judicious selection of the colour of the background.

Figure 4:
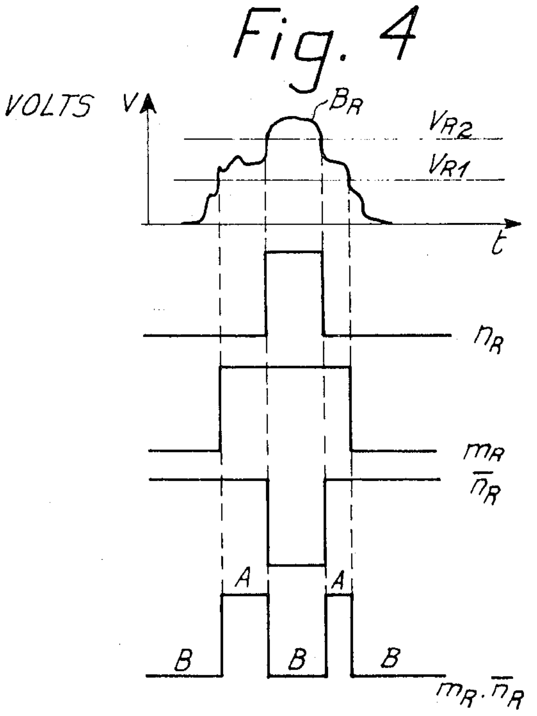
FIG. 4 is a graph showing the formation of a partial control signal for a primary image signal.

The graph shown in FIG. 4 depicting voltages variable as a function of time, shows the method of generation of a partial control signal from a red primary image signal. The amplitude of a video signal $B_R$ of the image signal B for red is compared to two reference voltages $VR_1$ and $VR_2$ corresponding to the limiting ordinates $R_1$ and $R_2$ along the axis R of the space $P_1$ of FIG. 3. A first auxiliary pulsing signal $n_R$ is then produced by comparing the amplitude of the video signal $B_R$ with the voltage $VR_2$. A second auxiliary pulsing signal $m_R$ is then produced by comparing the amplitude of the video signal $BR_R$ with the voltage $VR_1$. Conventional analog conversions render it possible to obtain the signal $\overline{n}_R$, then the signal $m_R \cdot \overline{n}_R$, in Boolean notation, which is the required partial pulsing control signals. The signal $m_R \cdot \overline{n}_R$ is at its higher level when $B_R$ falls between $VR_1$ and $VR_2$, and its lowel level when $B_R$ falls outside this range. The different stages of transfer of the signals A and B to the line transmitting the control signal are shown in FIG. 4. A switching action occurs for each front edge of the signal, and this switching action must occur within a very short time, that is of the order of 50 nanoseconds, to obtain a correct composite image.

The method of generation of the partial green and blue control signals is analogous to the preceding method described with reference to the red control signals. Complete control signals applied to the three switches of FIG. 2 is obtained by analog addition of the AND type of the three partial control signals. The partial control signal $m_R \cdot \overline{n}_R$ may define a volume comprised between two planes at right angles to the axis R, and thus have a magnitude which is too large. In this case, the analog product of the three partial control signals is taken to obtain the volume $P_1$ bounded by three pairs of planes at right angles to the respective three axes R,B,V.

Figure 5:
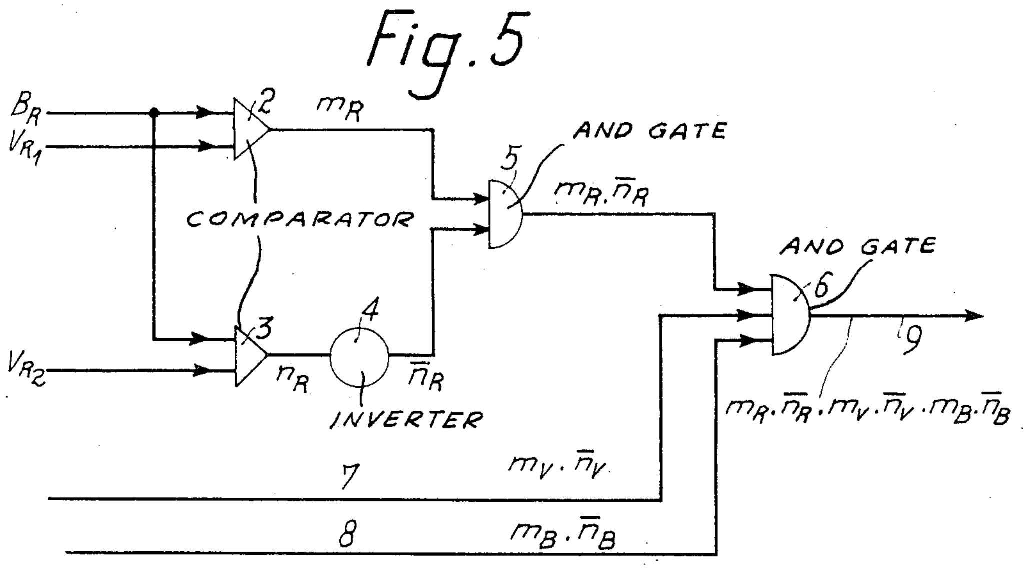
FIG. 5 is a circuit diagram for generating a complete control signal.

The circuitry shown in FIG. 5 allows the control signal to be obtained (the wellknown aligning and separating circuits having been omitted). The video signal $B_R$ is compared to the reference voltage $VR_1$ by means of the comparator 2 which generates the signal $m_R$. Analogously, the signal $B_R$ is compared to the reference voltage $VR_2$ by means of the comparator 3 which generates the signal $n_R$. The pulsing signal $m_R$ and $n_R$ have their upper or analog level 1 when $B_R$ is higher, respectively, than $VR_1$ and $VR_2$. The circuit 4 is an inverting circuit which generates the signal $\bar{n}_R$. Two other analogous circuit combinations have the input terminals for receiving the video signals $B_V$ and $B_B$ for green and blue, and generate the composite signals $m_V \cdot \bar{n}_V$ and $m_B \cdot \bar{n}_B$ on lines 7 and 8. The partial signals are fed to the input terminal of the AND gate 6 which generates the complete control signal:

$$m_R \cdot \bar{n}_R \cdot m_V \cdot \bar{n}_V \cdot m_B \cdot \bar{n}_B \text{ at the line 9.}$$

The complete control signal controls the switching action of the three contactors of FIG. 2 which may each consist of transistorized circuits of the type specified in the French Pat. application No. P.V. 70 04303 filed on the 6th of Feb. 1970.

Numerous modifications are possible which lie within the scope of the claims. In particular, the system for forming of the control signal may employ any system of colorimetric co-ordinates deduced from the R, V, B system by linear relationships. In particular, it is possible to employ the wellknown system of axes R – Y, B – Y, Y.

What we claim is:

1. A method for replacing a part of a first colour television image by a part of a second colour television image comprising the steps of: selecting first and second video signals representing said first and second colour television images according to respective first and second levels of a binary control signal; producing said first level of said binary control signal when one of said first and second video signals lies between two predetermined voltages, said two predetermined voltages lying within and not extending to the limits of said one of said first and second video signals, and producing said second level of said binary control signal when said one of said first and second video signals lies outside said two predetermined voltages.

2. A method as claimed in claim 1, wherein said first level is generated when the second video signals lie in a given closed region of a space defined by a chlorimetric coordinate system having orthogonal axes, said region defining the background of the image in the coordinate system, and said second level is generated when the second video signals lie in the remainder of the space.

3. A method as claimed in claim 2, wherein the closed region is a parallelepiped.

4. An apparatus for replacing a part of a first colour television image by a part of a second colour television image comprising means for selecting first and second video signals corresponding to said first and second colour television images according to respective first and second levels of a binary control signal; circuitry means for producing said first level of binary control signal when the amplitude of the second video signals lie in a given range and for producing the second level of binary control signal when the amplitude of said second video signals lie outside of said given range and wherein the limits of said given range are included within but do not extend to the limits of said second video signals.

5. Apparatus as claimed in claim 4, wherein said circuitry comprises a first comparator means for comparing said second video signals to a first reference voltage corresponding to the first level of said binary control signal, a second comparator means for comparing said second video signals to a second reference voltage corresponding to the second level of said binary control signal, an inverter for inverting the output of one of the comparators, an AND gate which is connected to said first comparator and said inverter.

* * * * *